United States Patent
Wu et al.

(10) Patent No.: US 11,095,699 B1
(45) Date of Patent: Aug. 17, 2021

(54) STREAMING MEDIA FILE MANAGEMENT

(71) Applicant: AMAZON TECHNOLOGIES, INC., Seattle, WA (US)

(72) Inventors: Yongjun Wu, Seattle, WA (US); Marc Joliveau, Seattle, WA (US); Stefan Christian Richter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/517,118

(22) Filed: Jul. 19, 2019

Related U.S. Application Data

(62) Division of application No. 15/180,903, filed on Jun. 13, 2016, now Pat. No. 10,432,686.

(51) Int. Cl.
*H04L 29/06* (2006.01)
*H04L 29/08* (2006.01)
*H04L 12/26* (2006.01)

(52) U.S. Cl.
CPC ........ *H04L 65/601* (2013.01); *H04L 43/0882* (2013.01); *H04L 65/607* (2013.01); *H04L 67/02* (2013.01)

(58) Field of Classification Search
CPC ... H04L 65/601; H04L 43/0882; H04L 67/02; H04L 65/607

USPC .......................................................... 709/219
See application file for complete search history.

(56) References Cited

U.S. PATENT DOCUMENTS

| | | | |
|---|---|---|---|
| 2004/0146285 A1 | 7/2004 | Matsui et al. | |
| 2011/0208829 A1* | 8/2011 | Kwon | H04N 21/23439 709/217 |
| 2013/0007223 A1 | 1/2013 | Luby et al. | |
| 2013/0191550 A1 | 7/2013 | Hannuksela | |
| 2014/0156863 A1 | 6/2014 | Gao et al. | |
| 2014/0304303 A1 | 10/2014 | Dalal et al. | |
| 2017/0085616 A1* | 3/2017 | Botsford | H04L 67/02 |

* cited by examiner

*Primary Examiner* — David R Lazaro
*Assistant Examiner* — Zia Khurshid
(74) *Attorney, Agent, or Firm* — Lowenstein Sandler LLP

(57) ABSTRACT

A system for delivering live streaming content based on accurate media data fragment size and duration. A media server may generate custom data identifying a size and duration of a current fragment of a media file. The media server may insert the custom data (e.g., as a custom header or unique packet identifier) and send the custom data to a client media player. The client media player may be configured to decode the custom data and determine the current fragment size and duration.

20 Claims, 6 Drawing Sheets

STREAMING MEDIA FILE MANAGEMENT

CROSS-REFERENCE TO RELATED APPLICATION

This application is a divisional of U.S. patent application Ser. No. 15/180,903, filed Jun. 13, 2016, the entirety of which is hereby incorporated by reference herein.

BACKGROUND

Consumers have an ever-increasing array of options for consuming media content, in terms of the types of media content (e.g., video, audio, text, etc.), providers of the media content, and devices for consuming the media content. Media content providers are becoming increasingly sophisticated and effective at providing media content quickly and reliably to consumers.

Media content (e.g., movies, television shows, videos, music, and electronic books) may be organized as a series of fragments including metadata and media data. In video on demand (VOD) scenarios, the size and duration of the fragments is encoded offline and detailed in a manifest file. For VOD, the manifest file may be used by a destination client to determine the size and duration of each fragment during the decoding process. Unlike video-on-demand (VOD) content, live streaming content typically does not have a distinct end point and may continue indefinitely. In addition, VOD content may be buffered in client devices well in advance of the client playhead (i.e., the content fragment being currently rendered by the client). This is not the case for live content streaming because the live content is being generated in real time and therefore may not yet exist.

Due to network reliability constraints and limited buffering availability, media data is often streamed over networks using adaptive bitrate streaming for playback on a viewer's device. Adaptive bitrate streaming includes determining the viewer device's bandwidth and hardware resources (e.g., available central processing unit (CPU) capacity) in real time and adjusting the quality of the media content that is requested from a media server and played back on the viewer's device to account for changes in the bandwidth and hardware resources. For example, variable bit rate (VBR) encoding may be employed and involves adjusting the data rate down to an upper limit, based on the data required by a compressor. In addition, some encoders permit the setting of a maximum allowed bitrate or maximum quality value, also known as Constrained Variable Bitrate (CVBR). However, since accurate fragment size and fragment duration determinations are not achieved in a live streaming context, adaptive bitrate streaming of a live stream produces performance issues resulting in an unreliable or lower quality playback of the media content.

In a conventional live streaming scenario, a current fragment of the media file is downloaded completely to determine the size and duration of the fragment. A client playback device's initial prediction of the current fragment size and duration may be incorrect (e.g., due to changes to available bandwidth) and determined only after full download of the fragment. This discrepancy results in re-buffering or interruption of the stream, thereby negatively impacting a user's viewing experience.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

The present disclosure relates to delivering live streaming content based on accurate media data fragment size and duration. In an example, a live streaming system including a client media player having a decoder is provided to operatively couple with a server-side content source including an encoder. The client media player may include an electronic device configured to receive a portion of a streaming media file (e.g., in an MP4 format), download a first sub-portion or percentage of the streaming media file including fragment-level metadata, and parse and analyze the fragment-level metadata to determine a size and duration of a current fragment of the media file, as described in detail below.

In an alternative embodiment, the live streaming media file may be encoded by a server with a custom header inserted in an initial portion of the fragment steam and include the fragment size and duration. The custom header (e.g., an Hypertext Transfer Protocol (HTTP) header) may indicate the fragment size (e.g., in bytes) and fragment duration (e.g., in a number of sample or milliseconds) for one or more fragments including a current fragment and a next fragment. In yet another embodiment, a custom packet identifier (PID) may be added to an initial portion of the fragment streaming (e.g., in the MPEG-2 TS format), wherein the custom PID carries information indicating the size and duration of one or more fragments of the live streaming media file.

Advantageously, the size and duration of the current fragment may be determined in live streaming instances when a manifest identifying the fragment size and duration is not available. Furthermore, use of the customer header, custom PID, or parsing of the fragment-level metadata to determine the fragment size and fragment duration may be performed economically since the entire fragment does not need to be downloaded to make the fragment size and duration determination. In addition, determination of the fragment size and duration allows the client to avoid re-buffering and interruption of the streaming media.

Identification of the fragment size and duration may be useful in managing various live streaming scenarios including, but not limited to, a constant bitrate (CBR) live stream with constant fragment duration, a CBR smooth stream with constant fragment duration, a constrained variable bitrate (CVBR) smooth stream with constant fragment duration, and CVBR and variable fragment duration for live streaming (e.g., Dynamic Adaptive Streaming over HTTP (DASH) and HTTP Live Streaming (HLS)).

In the following discussion, a general description of the system and its components is provided, followed by a discussion of the operation of the same. Although the description includes certain examples relating to particular types of files, formats, and protocols, in connection with the management of live streaming media, it is to be appreciated that the system is not limited to the enumerated examples.

Figure 1:
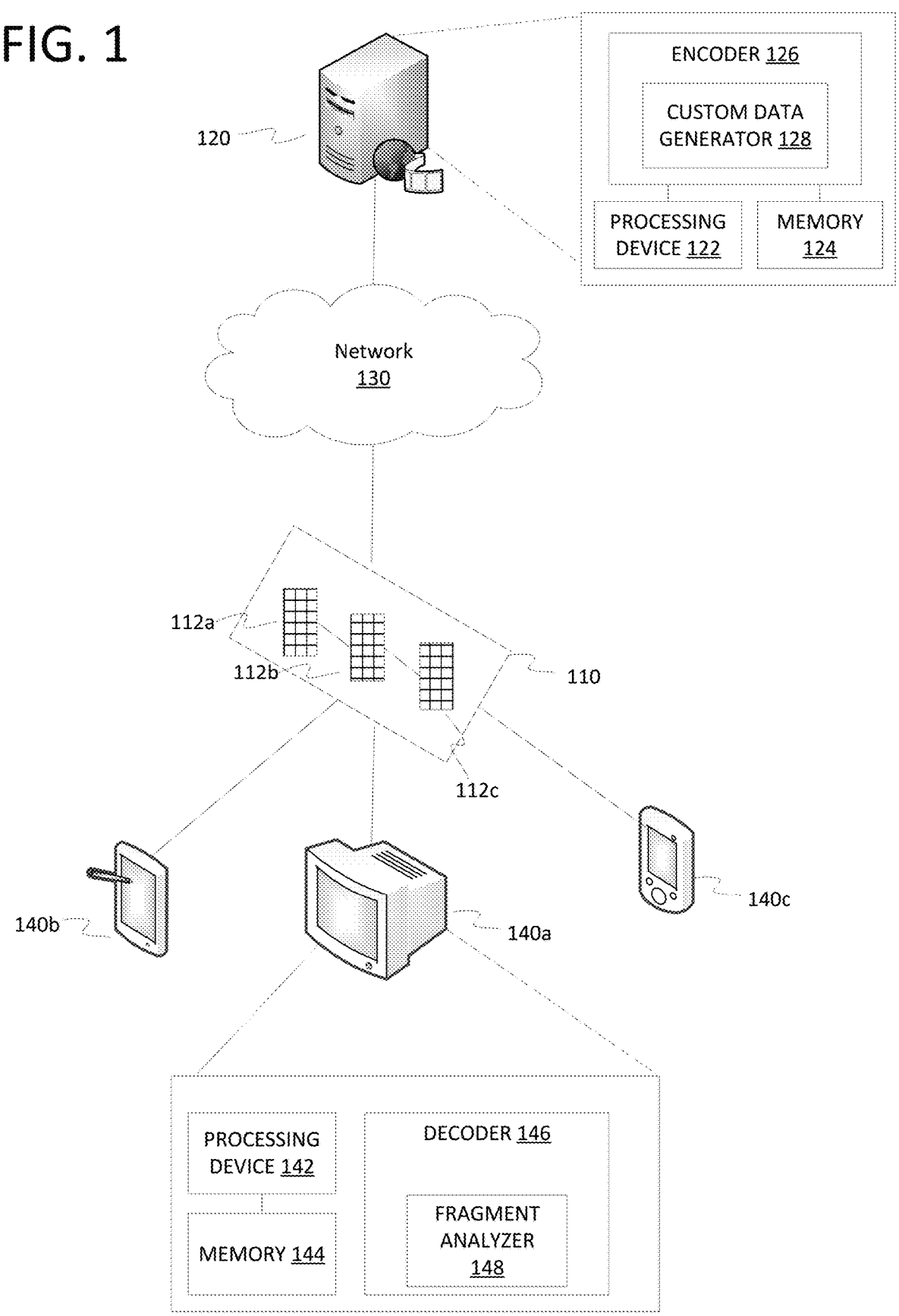
FIG. 1 illustrates an example system for managing live streaming media, according to various embodiments of the present disclosure.

FIG. 1 illustrates an example of content delivery network for delivering live streaming media 110 from a content source 120 (e.g., a media server) to a viewer device 140a, 140b, 140c (e.g., a client media player) for live media playback. As shown in FIG. 1, the content source 120 provides the media file 110 including multiple fragments 112a, 112b, 112c of media content to viewer device 140 via a network 130.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 120 may be part of a content delivery system that conforms to any of a wide variety of architectures. The functionality and components of media server 120 can use one or more servers and be deployed at one or more geographic locations (e.g., across different countries, states, cities, etc.) using a network (e.g., network 130) such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc.

The functionality described herein also may be implemented by one or more different entities. For example, the functionality to provide playback of media content can be integrated into a video player or software client under control of one entity (e.g., on viewer devices 140a-c), integrated into a separate application (app) from another entity, implemented in an edge server or content server of a CDN, a server of an ISP, etc. In some implementations, media server 120 may be integrated with one or more CDNs. Media server 120 can also communicate with CDNs, for example, to receive data or determine data representing performance characteristics of the CDNs. Media server 120 can also receive data from viewer devices 140a-c representing the playback of media content requested, for example, an indication of rebuffering, fatal errors, requested bitrates, and other metrics.

Viewer device 140 may be an electronic device including a processing device 142 and a memory 144, such as a smartphone or tablet, capable of playback of streaming media content including fragments 112a, 112b, and 112c. As an example, viewer device 140 can include a decoder 142 to receive the media 110 and decode the media for playback by the viewer device 140. In an implementation, the decoder 146 may include a fragment analyzer 148 configured to parse the fragments 112a, 112b, and 112c of the media 110 to determine the respective fragment sizes and fragment durations, as described in greater detail below in connection with FIGS. 2 and 3.

In the example arrangement shown in FIG. 1, viewer device 140a is a desktop computer, viewer device 140b is a tablet computing device, and viewer device 140c is a smartphone or other mobile computing device. Other types of devices such as set-top boxes, wearable devices (e.g., smart watches), virtual reality headsets, etc. may also be included in the computing environment.

The viewer device 140 may request playback of a live media stream 110 (e.g., a live sporting event) by providing a request to media server 120 for the fragments, or segments, of the playback of the media content available. A sequence of fragments (e.g., fragments 112a, 112b, 112c) together provides playback of the full media content. Audio portions of the media content can also be provided in fragments.

In an implementation, the decoder 146 of the viewer device 140 may receive a portion of the streaming media file 110 including a first fragment (e.g., fragment 112a) having a fragment-level metadata portion (or "moof") and a media data portion (or "mdat"). The decoder 146 may download a first portion of a first fragment-level metadata portion.

Advantageously, an accurate determination of fragment size and duration may be achieved by downloading a small portion of the total fragment data size (herein "Ts"). For example, the information used to determine the total fragment data size (Ts) and total fragment duration (Td) may be identified after downloading approximately 1 to 3% of the total fragment data size of a fragment (e.g., fragment 112a) of the media file 110. Accordingly, the present disclosure provides for a determination of an accurate total fragment data size (e.g., 1 MB, 2.5 MB, 5 MB, etc.) after downloading a relatively small portion (e.g., 100 bytes) of the total fragment.

In an implementation, the fragment analyzer 148 parses the downloaded portion of the fragment-level metadata (moof) to determine the fragment-level portion size, or size of the moof (also referred to as the "sizeof (moof)"). In addition, the fragment analyzer 148 parses the fragment-level metadata (moof) to identify the track fragment run (trun) of the fragment (e.g., fragment 112a). The track fragment run (trun) portion is a container or box within the fragment-level metadata file structure that includes information identifying the size of the media data of the fragment (also referred to as the "sizeof (mdat)") and a total duration of the fragment (also referred to as "Td"). The total fragment data size (Ts) may then be calculated by summing the sizeof (moof) and the sizeof (mdat). In addition, the trun may also include information identifying the total fragment duration (Td) which may be extracted during the parsing of the trun. As illustrated, the accurate total fragment data size (T) may be determined by downloading only a small portion of the media file. For example, a relatively small portion of the fragment-level metadata portion (moof) is downloaded and parsed to identify the sizeof (moof) and the sizeof (mdat). In an implementation, the sub-portion of the fragment-level metadata portion that is downloaded to capture the first track fragment run (trun) and sizeof (mdat) is approximately 1-3% of the total fragment data size (T).

In an implementation, the media server 120 may include a processing device 122 and a memory 124 operatively coupled to an encoder 126 including a custom data generator 128. The custom data generator 128 may be configured to create "custom" metadata to be added to a media file 110 to enable the decoder 146 of the viewer device 140 to identify the total fragment size (Ts) and total fragment duration (Td) of each of the various fragments of the media file 110, as described in detail below in connection with FIGS. 3-5.

In an implementation, the custom data generator 128 may create a custom header (e.g., an HTTP header in an HTTP-based stream) including metadata identifying the total fragment size and total fragment duration and insert the custom header with the associated fragment. Upon receipt, the viewer device 140 may be configured to download the custom header portion associated with the current fragment and decode the custom header to determine the total fragment data size (Ts) and the total fragment duration (Td).

In another implementation, the custom data generator 128 may generate a private packet identifier (PID) (also referred to as a "unique PID") that includes customized information identifying the total fragment data size (Ts) and the total fragment duration (Td) associated with a fragment. For example, for the MPEG-2 standard, a Network Information Table is specified which includes identifiers that may be privately defined or customized (e.g., unique PIDs). The custom data generator 128 may insert the total fragment data size (Ts) and total fragment duration (Td) metadata into the unique PID in the Network Information Table associated with the current fragment. The viewer device 140 may download the Network Information Table, review the unique PID, and determine the total fragment data size (Ts) and the total fragment duration (Td) for the current fragment (e.g., fragment 112a).

In each of the above-described implementations, a minimal amount of downloading is needed for the decoder 146 of the viewer device 140 to determine the total fragment data size (Ts) and the total fragment duration (Td) for the fragment currently being processed by the viewer device 140. Consequently, determination of the fragment size and duration for a fragment of a live stream may be achieved with minimal latency and enables the viewer device 140 to take an action or operation relating to the live stream download, as described below in greater detail with reference to FIG. 3.

Figure 2:
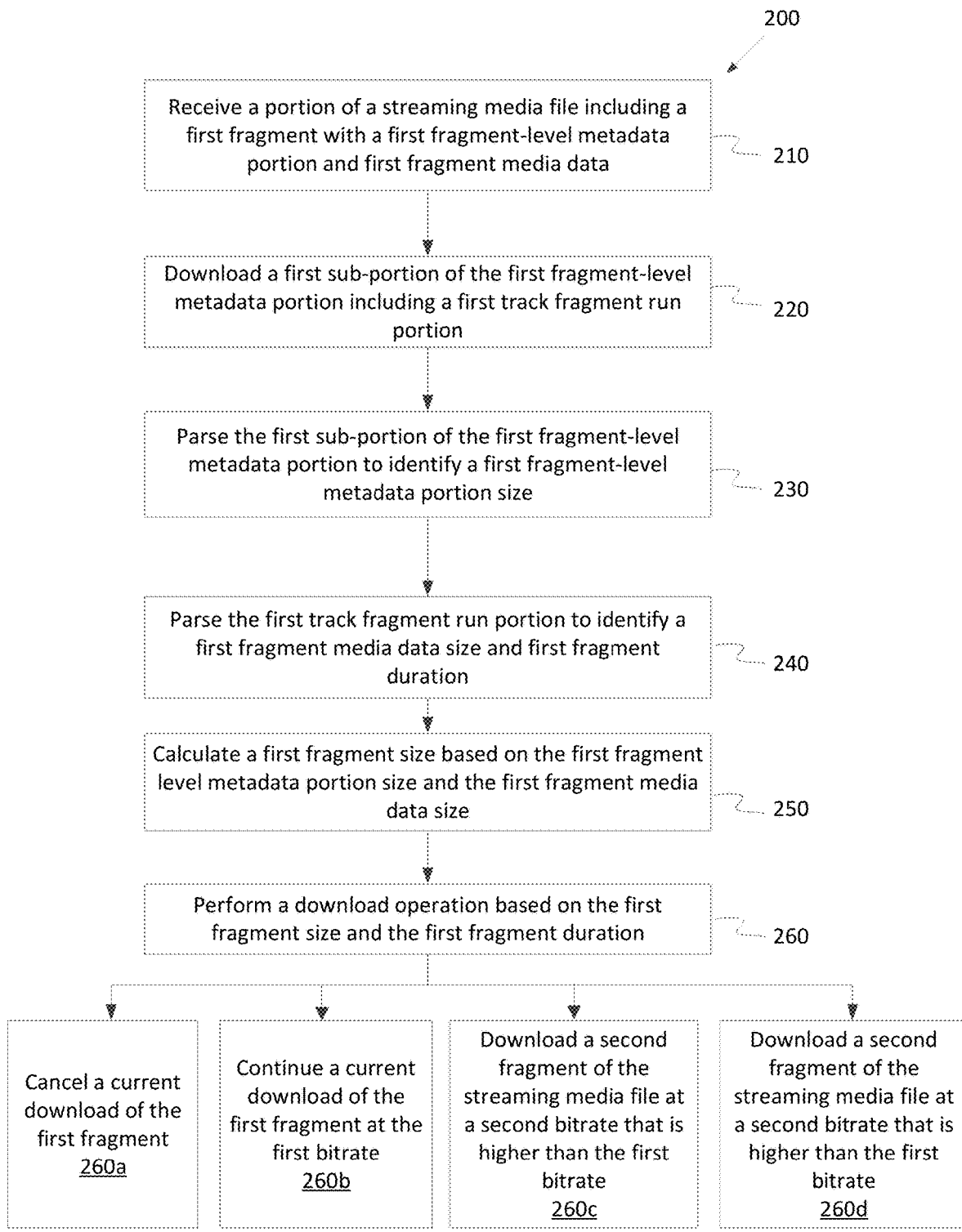
FIG. 2 depicts a flowchart illustrating an example of functionality implemented by a viewer device, according to various embodiments of the present disclosure.
Figure 3:
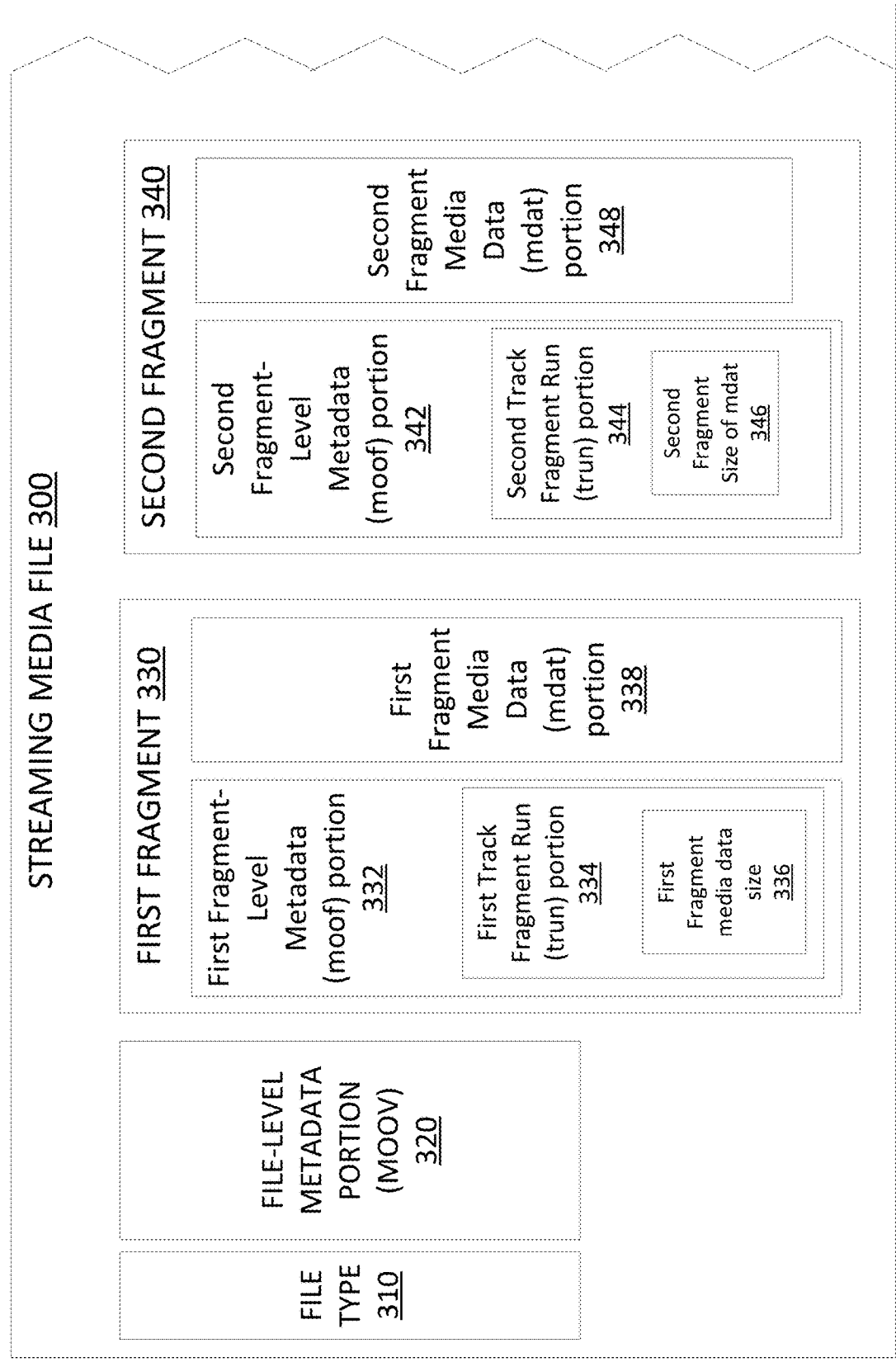
FIG. 3 illustrates an example streaming media file including a first fragment for processing according to various embodiments of the present disclosure.

An example implementation is described with reference to FIG. 1, the flow diagram of FIG. 2, and the example streaming media file 300 of FIG. 3. FIG. 2 illustrates a flowchart that provides an example of a process 200 executed by a viewer device having a fragment analyzer (e.g., fragment analyzer 148 of viewer device 140 of FIG. 1), according to various implementations of the present disclosure. It is understood that the flowchart of FIG. 2 provides an example of the many different types of functional arrangements that may be employed to implement the operation of the viewer device 140 and fragment analyzer 148 as described herein.

In block 210, a portion of a streaming media file including a first fragment and a second fragment is received by the viewer device. The streaming media file may include any suitable number of fragments. FIG. 3 illustrates a portion of an example streaming media file 300 including a first fragment 330 and a second fragment 340. The streaming media file 300 illustrated in FIG. 3 is not intended to represent a full streaming media file, as represented by the jagged line depicted in FIG. 3. The streaming media file 300 may other various other components including, but not limited to, a header identifying a file type 310 and a file-level metadata (moov) portion 320.

In block 220, a first sub-portion of the first fragment-level metadata (moof) portion is downloaded. In the example shown in FIG. 3, the first sub-portion that is downloaded includes the first track fragment run (trun) portion 334 of the first fragment-level metadata (moof) portion 332. In an implementation, the first-fragment-level metadata (moof) portion 332 may be downloaded before downloading the first fragment media data (mdat) portion 338 of the first fragment 330. Advantageously, the entire first fragment-level metadata (moof) portion 332 does not need to be downloaded before reaching the downloading of the first track fragment run (trun) portion 334. For example, the first track fragment run (trun) portion 334 may be downloaded by downloading approximately one-third or one-half of the first fragment-level metadata (moof) portion 332.

In block 230, the downloaded sub-portion of the first fragment-level metadata (moof) portion is parsed to identify a first fragment-level metadata portion size. The size of the first fragment-level metadata (moof) portion, represented by the expression "sizeof (moof)", is a component of the overall size of the first fragment.

In block 240, the downloaded first track fragment run (trun) portion is parsed to identify the first fragment media data size 336 (represented by the expression "sizeof (mdat)") and the first fragment duration (Td). In an implementation, the first fragment media data size is specified in the first track fragment run (trun) portion and may be extracted therefrom by the fragment analyzer. In an implementation, the size of the media data in the fragment (i.e., sizeof (mdat)) may be calculated by identifying the size of the each of the compressed frames of the fragment and summing the compressed frame sizes. Advantageously, the sizeof(mdat) is embedded in the track fragment run (trun) portion of the fragment-level metadata (moof) portion. Accordingly, the sizeof (mdat) may be identified by the fragment analyzer after downloading only the sub-portion of the fragment-level metadata (moof) portion that includes the track fragment run (trun) portion.

In block 250, the total fragment data size (Ts) of the first fragment is calculated based on the first fragment-level metadata (moof) portion size (sizeof (moof)) and the first fragment media data size (sizeof (mdat)). In an implementation, the total fragment data size (Ts) may be calculated according to the following expression:

$$Ts=sizeof(moof)+sizeof(mdat)$$

In an example, the sizeof (moof) may be very small compared to the total fragment data size (e.g., sizeof (moof) may be 1-3% of Ts). In addition, the total fragment duration (Td) may be identified based on the metadata extracted from the track fragment run (trun) portion, in block 240.

Determining the total fragment data size (Ts) and total fragment duration (Td) of the current fragment (e.g., the first fragment 330 of FIG. 3) after downloading the sub-portion of the fragment-level metadata (moof) portion 332 enables the fragment analyzer to perform a download operation relating to the current fragment or a next fragment in the series, in block 260. Conventional live streaming requires an entire fragment to be downloaded before the total fragment data size and duration are known, and consequently, download related action may be taken with respect to a next fragment. However, according to implementations of the present disclosure, a download operation may be taken with respect to the current fragment since the total fragment data size (Ts) and total fragment duration (Td) may be determined during the download of the fragment-level metadata (moof) portion 332.

In block 260, any suitable download operation may be performed based on the identification of the total fragment data size (Ts) and the total fragment duration (Td). For example, the current download of the first fragment may be canceled, in block 260a. In this example, it may be determined that the total fragment data size (Ts) or total fragment duration (Td) are higher than expected (e.g., due to variations in the available bandwidth) and that continuing the download of the first fragment at a first bitrate may result in re-buffering or interruption.

In another example, the current download of the first fragment at the current bitrate (e.g., a first bitrate) may continue, in block 260b. In this example, it may be determined that the current available bandwidth is sufficient to download the current fragment (e.g., the first fragment 330 of FIG. 3) based on the identified total fragment data size (Ts) and total fragment duration (Td).

In yet another example, the viewer device may download a next fragment (e.g., the second fragment 340 in FIG. 3) at a second bitrate that is higher than the first bitrate (i.e., the bitrate used in downloading the first fragment 330), in block 260c. In this example, based on the identified total fragment data size (Ts) and total fragment duration (Td) of the first fragment, the viewer device may determine that the next fragment (e.g., second fragment 340 of FIG. 3) may be downloaded at a higher bitrate than the bitrate of the first fragment download (i.e., the adjusted or second bitrate is higher than the first bitrate).

In another example, the viewer device may download a next fragment (e.g., the second fragment 340 in FIG. 3) at a second bitrate that is lower than the first bitrate (i.e., the bitrate used in downloading the first fragment 330), in block 260d. In this example, based on the identified total fragment data size (Ts) and total fragment duration (Td) of the first fragment, the viewer device may determine that the next fragment (e.g., second fragment 340 of FIG. 3) may be downloaded at a lower bitrate than the bitrate of the first fragment download (i.e., the adjusted or second bitrate is less than the first bitrate).

Figure 4:
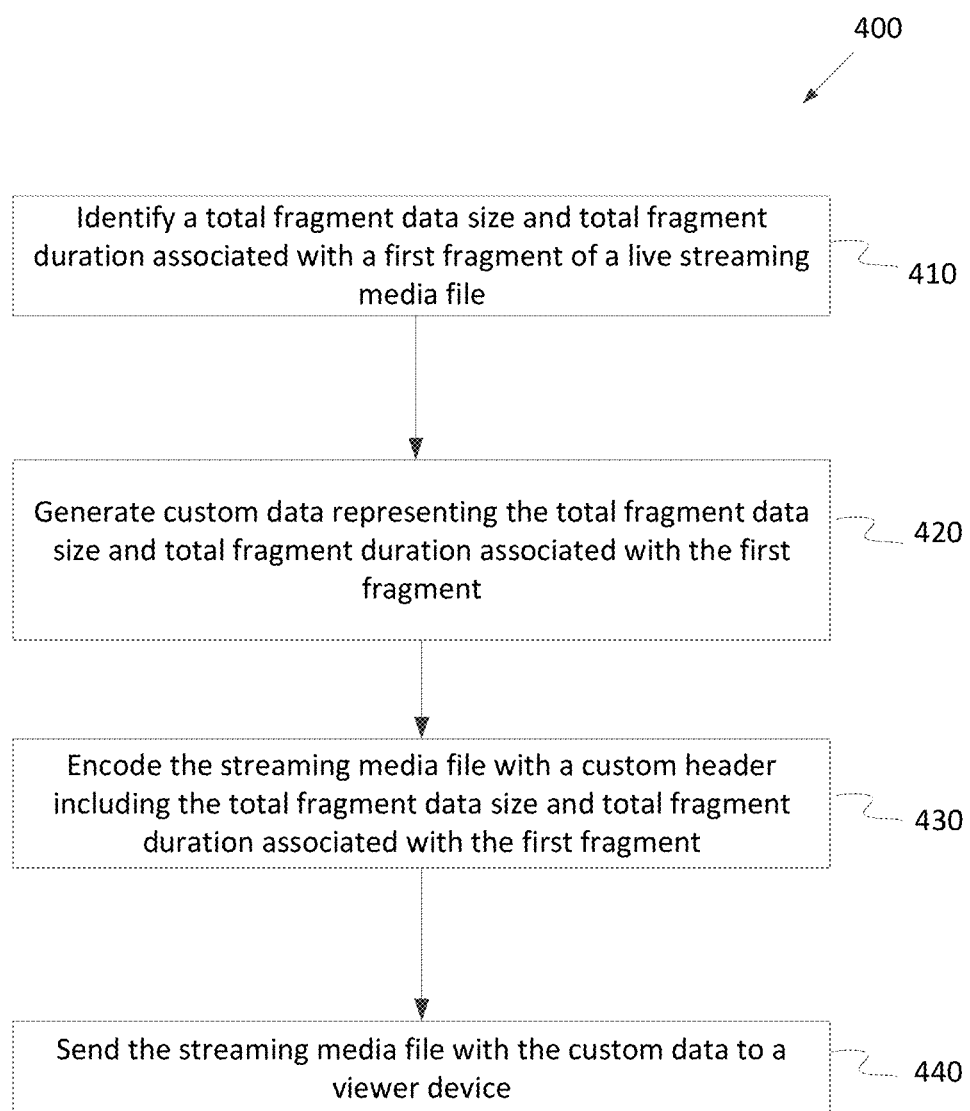
FIG. 4 depicts a flowchart illustrating an example of functionality implemented by a media server, according to various embodiments of the present disclosure.

An example implementation is described with reference to FIG. 1, the flow diagram of FIG. 4, and the example media files 501 and 502 of FIG. 5. FIG. 4 illustrates a flowchart that provides an example of a process 400 executed by a media server having an encoder with a custom data generator (e.g., custom data generator 128 of media server 120 of FIG. 1), according to various implementations of the present disclosure. It is understood that the flowchart of FIG. 4 provides an example of the many different types of functional arrangements that may be employed to implement the operation of the media server 120 and custom data generator 128 as described herein.

In block 410, a total fragment data size and total fragment duration associated with a first fragment of a live streaming media file are identified by an encoder of a media server. In block 420, custom data representing the total fragment data size and total fragment duration associated with a first fragment is generated. In an implementation, the encoder of the media server is configured to include a custom data generator. The custom data generator may determine the transport protocol (e.g., HTTP, DASH, MPEG TS, MPEG-2 TS, etc.) associated with the live streaming media file and generate the custom data in accordance with the identified transport protocol. The custom data generator may be configured to generate custom data for any suitable transport protocol. For example, the custom data generator may determine that the transport protocol for transmission of the current streaming media file is HTTP and generate a custom HTTP header including the metadata representing the total fragment data size and total fragment duration associated with a first fragment.

In an example, the custom data generator may determine that the protocol for transmission of the current streaming media file to a viewer device is the MPEG-2 Transport Stream (TS) format and generate a unique packet identifier (PID) or unique PID table including the total fragment data size and total fragment duration associated with a first fragment.

In block 430, the streaming media file is encoded with the custom data (e.g., custom HTTP header, unique PID, etc.). As shown in FIG. 5, the custom data generator 528 may encode a streaming HTTP media file 500a with a custom HTTP header 530 including the custom data 510a identifying the first fragment size and the first fragment duration. In an implementation, the custom HTTP header may further include metadata relating to additional fragments, such as a second fragment size and a second fragment duration.

Figure 5:
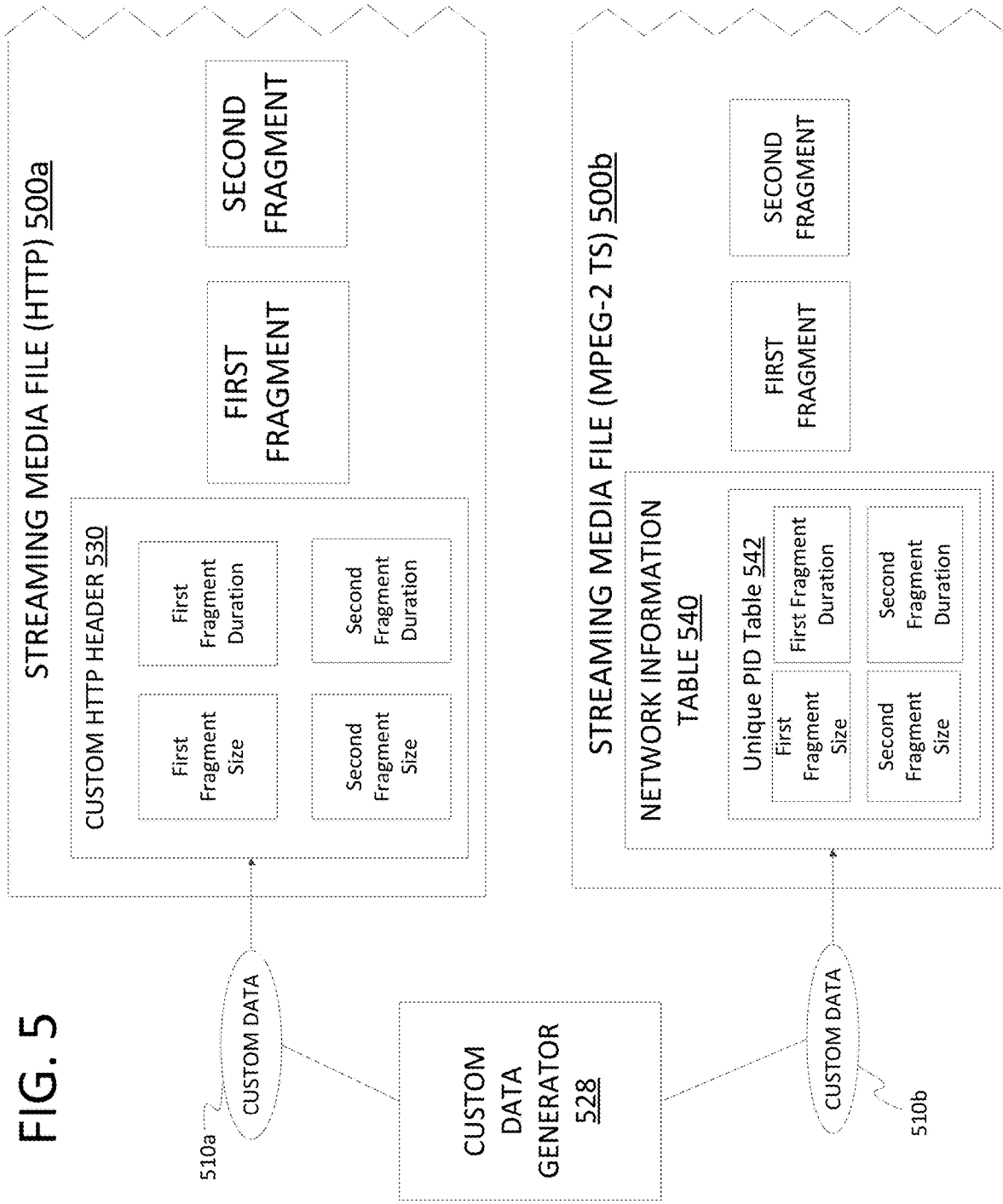
FIG. 5 illustrates multiple example streaming media file including custom data according to various embodiments of the present disclosure.

FIG. 5 further illustrates the custom data generator 528 encoding a streaming MPEG-2 TS media file with custom data 510b for inclusion in a Network Information Table 540. The custom data identifies the first fragment size and the second fragment size and may be added to the Network Information Table 540 as a unique PID table 542. The unique PID table 542 may include any number of custom data entries identifying the fragment size and fragment duration for any number of fragments.

In block 440 of FIG. 4, the streaming media file with the custom data (e.g., the custom HTTP header, the unique PID table, etc.) identifying the fragment size and duration is sent to a viewer device. In implementations, the viewer device is configured with a decoder capable of decoding the custom HTTP header or unique PID table to identify the fragment size and duration. As described above in detail with respect to FIG. 2, upon receipt of the customized media file, the viewer device may perform a download operation (e.g., the download operations 260a-d shown in FIG. 2) based on the fragment size and fragment duration identified in the custom data.

Figure 6:
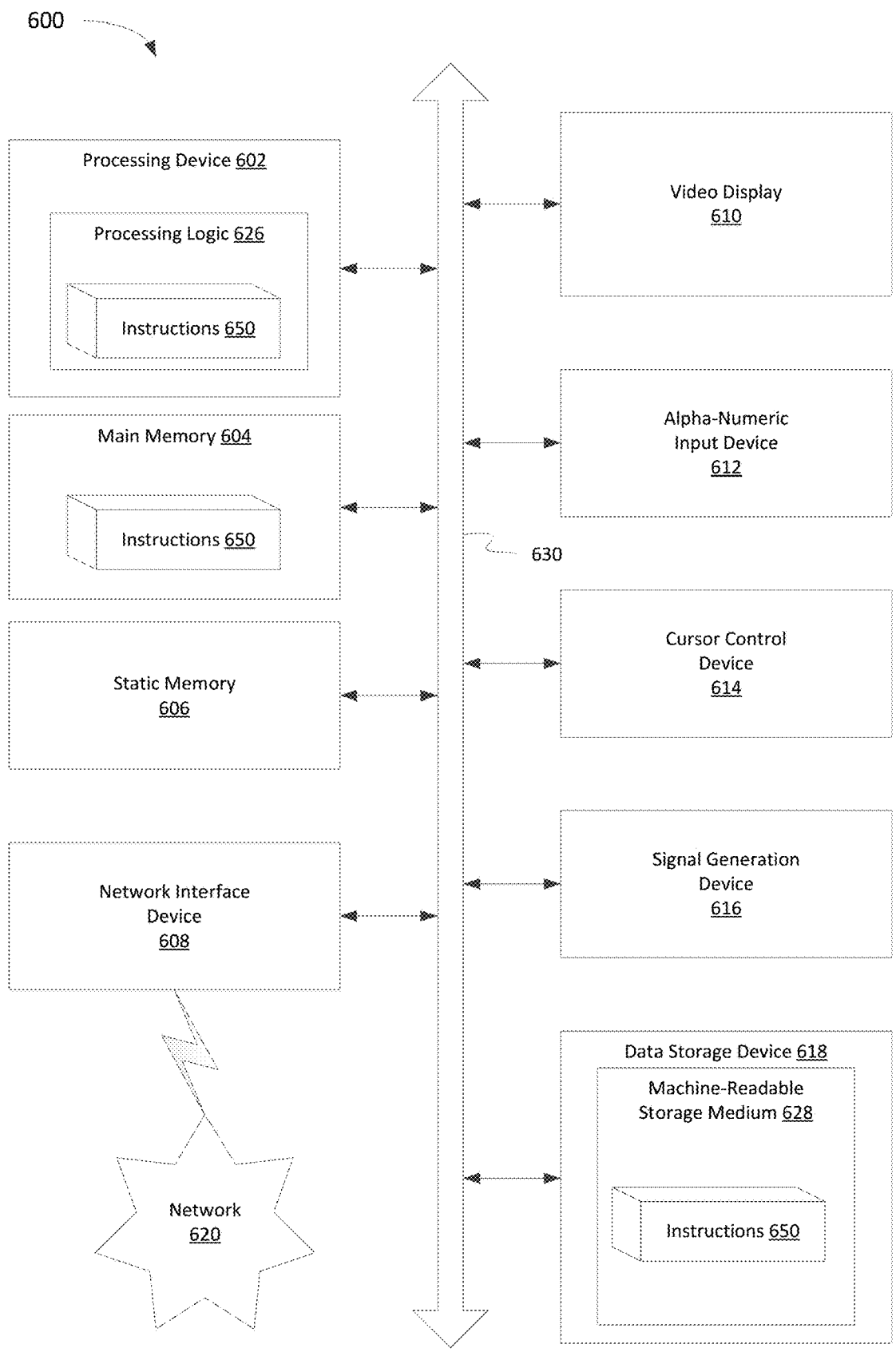
FIG. 6 is a schematic block diagram that provides one example illustration of a computing environment executing instructions relating to processing a streaming media file, according to various embodiments of the present disclosure.

FIG. 6 illustrates a diagrammatic representation of a machine in the example form of a computer system 600 within which a set of instructions 650, for causing the machine to perform any one or more of the methodologies discussed herein, may be executed. The system 600 may be in the form of a computer system within which a set of instructions 100, for causing the machine to perform any one or more of the methodologies discussed herein, may be executed. In an implementation, the instructions 650 may enable execution of process 200 of FIG. 2 by a fragment analyzer of a viewer device (e.g., fragment analyzer 148 of viewer device 140 in FIG. 1). In another implementation, the instructions 650 may enable execution of process 400 of FIG. 4 by a custom data generator of an encoder executed by a media server (e.g., custom data generator 128 of encoder 126 executed by media server 120 in FIG. 1).

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may represent computing device(s) 120 or 140 of FIG. 1.

The example computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. In various implementations of the present disclosure, the processing device 602 is configured to execute instructions for a custom data generator 128 or a fragment analyzer 148 for performing the operations and processes described herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions of the custom data generator 128 or fragment analyzer 148 embodying any one or more of the methodologies or functions described herein. The instructions may also reside, completely or at least partially, within the main memory 604 and/or within processing logic 626 of the processing device 602 during execution thereof by the computer system 600, the main memory 604 and the processing device 602 also constituting computer-readable media.

The instructions may further be transmitted or received over a network 620 via the network interface device 608. While the computer-readable storage medium 628 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely presented as examples. Particular implementations may vary from these example details and still be contemplated to be within the scope of the present invention. In the above description, numerous details are set forth.

It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "receiving", "downloading", "parsing", "calculating", "performing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying, by a processing device, a total fragment data size of a fragment of a streaming media file;
   identifying a total fragment duration associated with the fragment of the streaming media file;
   generating metadata representing the total fragment data size and the total fragment duration associated with the fragment;
   encoding the streaming media file with a custom data portion comprising the metadata comprising the total fragment data size and the total fragment duration associated with the fragment; and
   sending a portion of the streaming media file comprising the custom data portion to a viewer device, wherein the viewer device performs a first download operation of the custom data portion, decodes the custom data portion to identify the total fragment data size and the total fragment duration associated with the fragment, and performs a second download operation relating to the fragment based on the total fragment data size and the total fragment duration associated with the fragment.

2. The method of claim 1, wherein the custom data portion is encoded in a header inserted into the streaming media file.

3. The method of claim 1, wherein the custom data portion is encoded in a unique packet identifier (PID) inserted into the streaming media file.

4. The method of claim 3, wherein the unique PID is inserted into a network information table of the streaming media file.

5. The method of claim 1, further comprising identifying a transport protocol associated with the streaming media file, wherein the transport protocol comprises one of an Hypertext Transfer Protocol (HTTP) format or an MPEG-2 Transport Stream (TS) format.

6. The method of claim 5, further comprising generating, based on the transport protocol, the custom data portion.

7. The method of claim 1, wherein the second download operation comprising at least one of canceling a download of the fragment, continuing the download of the fragment, determining an updated bitrate to download a subsequent fragment.

8. A system comprising:
   a memory to store instructions; and
   a processing device operatively coupled to the memory, the processing device to execute the instructions to:
   identify a fragment data size and fragment duration associated with a fragment of a streaming media file;
   generate metadata representing the fragment data size and the fragment duration associated with the fragment;
   encode the streaming media file with a data portion comprising the metadata comprising the fragment data size and the fragment duration associated with the fragment; and
   send the data portion of the streaming media file to a viewer device, wherein the viewer device performs a first download operation of the data portion, decodes the custom data portion to identify the fragment data size and the fragment duration associated with the fragment, and performs a second download operation relating to the fragment based on the fragment data size and the fragment duration associated with the fragment.

9. The system of claim 8, wherein the data portion is encoded in a header inserted into the streaming media file.

10. The system of claim 8, wherein the data portion is encoded in a unique packet identifier (PID) inserted into the streaming media file.

11. The system of claim 10, wherein the unique PID is inserted into a network information table of the streaming media file.

12. The system of claim 8, wherein the processing device to identify a transport protocol associated with the streaming media file.

13. The system of claim 12, wherein the processing device is further to generate the data portion in view of the transport protocol, wherein a header of the streaming media file comprises the metadata.

14. The system of claim 8, wherein the second download operation comprising at least one of canceling a download of the fragment, continuing the download of the fragment, determining an updated bitrate to download a subsequent fragment.

15. A non-transitory computer-readable storage device storing computer-executable instructions that, if executed by a processing device, cause the processing device to:
   identify a fragment data size and fragment duration associated with a fragment of a streaming media file;
   generate metadata representing the fragment data size and the fragment duration associated with the fragment;
   encode the streaming media file with a data portion comprising the metadata comprising the fragment data size and the fragment duration associated with the fragment; and
   send the data portion of the streaming media file with the metadata to a viewer device, wherein the viewer device performs a first download operation of the data portion, decodes the data portion to identify the fragment data size and the fragment duration associated with the fragment, and performs a second download operation relating to the fragment based on the fragment data size and the fragment duration associated with the fragment.

16. The non-transitory computer-readable storage device of claim 15, wherein the data portion is encoded in a header inserted into the streaming media file.

17. The non-transitory computer-readable storage device of claim 15, wherein the data portion is encoded in a unique packet identifier (PID) inserted into the streaming media file.

18. The non-transitory computer-readable storage device of claim 17, wherein the unique PID is inserted into a network information table of the streaming media file.

19. The non-transitory computer-readable storage device of claim 15, the processing device to:
   identify a transport protocol associated with the streaming media file; and
   generate the data portion in view of the transport protocol.

20. The non-transitory computer-readable storage device of claim 15, wherein the second download operation comprising at least one of canceling a download of the fragment, continuing the download of the fragment, determining an updated bitrate to download a subsequent fragment.

* * * * *